United States Patent
Puyou et al.

(10) Patent No.: US 9,377,782 B2
(45) Date of Patent: Jun. 28, 2016

(54) METHOD FOR ASSISTING IN THE PILOTING OF AN AIRCRAFT DURING A LANDING AND PILOTING ASSISTANCE SYSTEM SUITABLE FOR IMPLEMENTING THIS METHOD

(71) Applicant: Airbus Operations (SAS), Toulouse (FR)

(72) Inventors: Guilhem Puyou, Toulouse (FR); Fabien Perrin, Toulouse (FR); Matthias Eberle, Tournefeuille (FR); Matthieu Barba, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 138 days.

(21) Appl. No.: 14/058,690

(22) Filed: Oct. 21, 2013

(65) Prior Publication Data

US 2014/0114506 A1    Apr. 24, 2014

(30) Foreign Application Priority Data

Oct. 22, 2012  (FR) ..................................... 12 60036

(51) Int. Cl.
| | |
|---|---|
| *G05D 1/06* | (2006.01) |
| *G08G 5/02* | (2006.01) |
| *B64D 45/00* | (2006.01) |
| *B64D 45/04* | (2006.01) |

(52) U.S. Cl.
CPC .............. *G05D 1/0676* (2013.01); *G08G 5/025* (2013.01); *B64D 45/04* (2013.01); *B64D 2045/008* (2013.01)

(58) Field of Classification Search
None
See application file for complete search history.

(56) References Cited

U.S. PATENT DOCUMENTS

| | | | | |
|---|---|---|---|---|
| 5,593,114 | A | * | 1/1997 | Ruhl ..................... G05D 1/0676 244/183 |
| 6,111,526 | A | | 8/2000 | Aymeric et al. |
| 2010/0082187 | A1 | * | 4/2010 | Nichols .................. G01C 23/00 701/16 |
| 2011/0137492 | A1 | | 6/2011 | Sahasrabudhe et al. |
| 2013/0046462 | A1 | * | 2/2013 | Feyereisen ............. G08G 5/025 701/457 |

FOREIGN PATENT DOCUMENTS

| | | |
|---|---|---|
| FR | 2752051 | 2/1998 |
| WO | 2009042309 | 4/2009 |

OTHER PUBLICATIONS

French Search Report, Jun. 18, 2012.

* cited by examiner

*Primary Examiner* — John R Olszewski
*Assistant Examiner* — Gerrad A Foster
(74) *Attorney, Agent, or Firm* — Greer, Burns & Crain, Ltd.

(57) ABSTRACT

A method for assisting in the piloting of an aircraft during a landing on a landing area on the ground. The method includes the following steps: (1) during a landing phase, while the landing area on the ground is visible from the aircraft: displaying, on a screen of the cockpit of the aircraft, a target corresponding to this landing, overlaid on a view outside the aircraft; receiving from a pilot a command to modify this target and displaying the duly modified target; and receiving a command to validate a value of the target by a pilot; (2) automatically determining an aircraft flight trajectory as a function of the aircraft's current position and of the value of the target validated by the pilot and storing this trajectory; and (3) guiding the aircraft along the stored trajectory. Also a piloting assistance system suitable for implementing this method is disclosed.

15 Claims, 4 Drawing Sheets

METHOD FOR ASSISTING IN THE PILOTING OF AN AIRCRAFT DURING A LANDING AND PILOTING ASSISTANCE SYSTEM SUITABLE FOR IMPLEMENTING THIS METHOD

CROSS-REFERENCES TO RELATED APPLICATIONS

This application claims the benefit of the French patent application No. 12 60036 filed on Oct. 22, 2012, the entire disclosures of which are incorporated herein by way of reference.

BACKGROUND OF THE INVENTION

The present invention relates to the field of the landing of aircraft, in particular transport airplanes, on a landing area on the ground, in particular on a landing runway. A number of types of approaches can be used to land an aircraft, corresponding to a more or less automatic landing. Possible approaches are notably dependent on the equipment available on board the aircraft as well as the equipment available on the ground. For example, a fully automatic landing, category 3B, presupposes an airport equipped with so-called category 3B ILS (Instrument Landing System) instruments and an aircraft comprising systems compatible with these ILS instruments. When an automatic landing is not possible, the pilot of the aircraft must fly a landing by manual piloting. For such a landing, the aircraft is generally guided automatically, along its flight plane, as far as a height called "decision height," then, if the visibility is sufficient at this decision height, the pilot controls the aircraft manually until it lands. The present invention relates more particularly to the phase corresponding to the flight of the aircraft between its passage at this decision height and its landing.

During the automatic guiding of the aircraft before it reaches the decision height, the systems of the aircraft handle its guidance along a predetermined trajectory by using either an external relative positioning system (notably of ILS type) which directly provides a trajectory deviation, or absolute aircraft positioning information available on board said aircraft as well as the geographic coordinates of the landing runway. This absolute position of the aircraft can notably be supplied by an inertial unit or by a system of VOR (Very High Frequency Omnidirectional Range) type or of GNSS (Global Navigation Satellite System) type, in particular of GPS (Global Positioning System) or Galileo type. Such a GNSS system can be augmented or not with a local adjustment, for example by using a WAAS (Wide Area Augmentation System) or EGNOS (European Geostationary Navigation Overlay Service) network. Like any measurement system, these systems provide the position of the aircraft with a determined accuracy and there is therefore a position error corresponding to the difference between the real position of the aircraft and the value of the position information available on board said aircraft. Consequently, during a transition, at the decision height, from automatic guidance to manual guidance of the aircraft, there is a position error between the real position of the aircraft and its theoretical position on said predetermined trajectory. The result of this is the drawback that, in the manual piloting to the landing, the pilot must carry out maneuvers to compensate this position error in order correctly to land the aircraft. This increases the workload of the pilot.

Document U.S. Pat. No. 5,593,114 A describes a system for assisting in the piloting of an aircraft in which a pilot has means enabling him or her to display a cursor on a screen where a landing runway is also displayed. The cursor comprises a cruciform symbol corresponding to a desired point of contact of the aircraft with the ground, as well as a line corresponding to an aircraft taxiing trajectory on the ground. The pilot has an interface enabling him or her to adjust the position and the orientation of the cursor on the landing runway. The system also displays a symbol corresponding to the speed vector of the aircraft. To be able to land on the runway, the pilot must align the symbol representing the speed vector with the cruciform symbol of the cursor. This system therefore assists the pilot during the landing by showing him or her this cursor on which he or she must align the symbol representing the speed vector. However, the movements of the aircraft during landing have the effect of producing movements of the cursor relative to the landing runway on the screen. This occurs in particular when the pilot is maneuvering the aircraft so as to try to align the symbol representing the speed vector with the cruciform symbol of the cursor. Consequently, depending on the movements of the aircraft, the pilot is required, several times during the landing, to have to modify the adjustment of the position and of the orientation of the cursor by means of said interface. This constitutes an additional workload for the pilot who has to constantly monitor the position and the orientation of the cursor in relation to the landing runway and modify them if necessary. Furthermore, such an operating mode is not compatible with an automatic aircraft landing when the pilot has to modify the settings of the cursor several times during the landing.

SUMMARY OF THE INVENTION

The object of the present invention is to remedy the abovementioned drawbacks. It relates to a method for assisting in the piloting of an aircraft during a landing on a landing area on the ground, this aircraft comprising at least one display screen in its cockpit as well as human-machine interface means associated with this screen. This method is noteworthy in that it comprises the following steps:

A) during a phase corresponding to this landing, during which said landing area on the ground is visible from the aircraft:

A1) displaying, on said screen, a target corresponding to this landing, overlaid on a view outside the aircraft, said view comprising a view of at least a part of the landing area on the ground;

A2) receiving a command to modify the target by a pilot of the aircraft, using the human-machine interface means associated with this screen and displaying the duly modified target on this screen;

A3) receiving a command to validate a value of the target by a pilot of the aircraft, using the human-machine interface means associated with this screen;

B) automatically determining a flight trajectory of the aircraft as a function of at least the relative position of the aircraft in relation to the value of the target validated by the pilot in the step A3) and storing this trajectory; and C) guiding the aircraft along the trajectory stored in the step B).

This method therefore enables a pilot to define a value of the target overlaid on the view outside the aircraft, and then validate this value. Thus, the target is positioned on the screen relative to the view outside the aircraft, therefore relative to the landing area. This view outside the aircraft being a view from the current position of the aircraft, the value of the target validated by the pilot is therefore referenced in relation to the current position of the aircraft. Consequently, the trajectory determined in the step B) enables the aircraft to land in accordance with this target, without being disturbed by the aircraft position error when said aircraft is located at the decision height. Since the trajectory is stored, it is sufficient to guide the aircraft along said trajectory, in order to perform a landing conforming to the value of the target validated by the pilot. This stored trajectory is insensitive to the movements of the aircraft after said validation of a value of the target by the pilot. This trajectory extends between the current position of the aircraft at the time of validation of the target by the pilot in the step A3) and the position of the target validated by the pilot.

Preferably, the target comprises a target point on the ground. Advantageously, it also comprises an axis of a taxiing trajectory on the ground and/or the FPA (Flight Path Angle) slope of the last segment of approach to the target point on the ground.

In a preferred embodiment, the screen is a head-up display HUD type device. Thus, the view outside the aircraft corresponds to what the pilot sees, outside the aircraft, when he or she looks through this HUD-type screen. It is not therefore necessary to acquire and display this view using embedded means on board the aircraft.

Advantageously, the landing area on the ground corresponds to a landing runway.

In one embodiment of the invention, the value of the target displayed in the step A1) is determined as a function of characteristics of the landing runway. These characteristics may notably correspond to coordinates of the landing runway.

In another embodiment, the value of the target displayed in the step A1) is determined as a function of the current route of the aircraft.

Advantageously, the step A2) is performed iteratively. The pilot can thus modify the target until it corresponds to the desired landing.

Preferably, the value of the target validated by the pilot in the step A3) is stored and, during the step C), a target corresponding to said stored value is displayed overlaid on the view outside the aircraft. Thus, the display of the target is maintained after the validation of said value of the target by the pilot in the step A3). Since the duly displayed target corresponds to the value of the target validated in the step A3), the pilot can thus verify that the value of the target that he or she has validated is correctly positioned in relation to the desired landing area.

Also advantageously, the steps A2), A3) and B) are repeated during the step C). Thus, if the pilot notices during the guiding of the aircraft along the trajectory computed in the step B) that the target does not correspond sufficiently accurately to the desired landing, he or she can further modify this target.

According to one embodiment, the trajectory determined and stored in the step B) is defined in a terrestrial reference frame. According to another embodiment, the trajectory determined and stored in the step B) is defined in a reference frame referenced in relation to the position of the aircraft at the time of the validation of the value of the target by the pilot in the step A3).

The invention also relates to an aircraft piloting assistance system, said system comprising at least one display screen in the cockpit of the aircraft as well as human-machine interface means associated with this screen. This piloting assistance system is noteworthy in that it comprises:

a device for dialogue with a pilot, this device being configured to:
display on this screen, during a landing of the aircraft on a landing area on the ground visible from the aircraft, a target corresponding to this landing, overlaid on a view outside the aircraft, said view comprising a view of at least a part of the landing area on the ground;
receiving a command to modify the target by a pilot of the aircraft, using the human-machine interface means, and displaying the duly modified target; and
receiving a command to validate a value of the target by a pilot of the aircraft, using the human-machine interface means;
a memory;
computation means configured to determine automatically a flight trajectory of the aircraft as a function of at least the relative position of the aircraft in relation to the value of the target validated by the pilot and to store this trajectory in said memory; and
guiding means configured to guide the aircraft along the flight trajectory stored in said memory.

In a preferred embodiment, the screen is a head-up display HUD type device.

In one embodiment of the invention, the guiding means comprise a flight director configured to automatically control the display, in the cockpit, of indications enabling a pilot to guide the aircraft along the flight trajectory stored in said memory. In another embodiment, these guiding means comprise an automatic pilot configured to automatically guide the aircraft along the flight trajectory stored in said memory. This makes it possible to perform the landing entirely automatically and therefore reduce the workload of the pilot. This landing can be performed automatically even if the landing area is not a landing runway, or even if it is a landing runway whose coordinates are not available on board the aircraft.

The invention also relates to an aircraft comprising a piloting assistance system as described previously.

BRIEF DESCRIPTION OF THE DRAWINGS

The invention will be better understood on reading the following description and studying the appended figures.

DETAILED DESCRIPTION OF THE PREFERRED EMBODIMENTS

Figure 1:
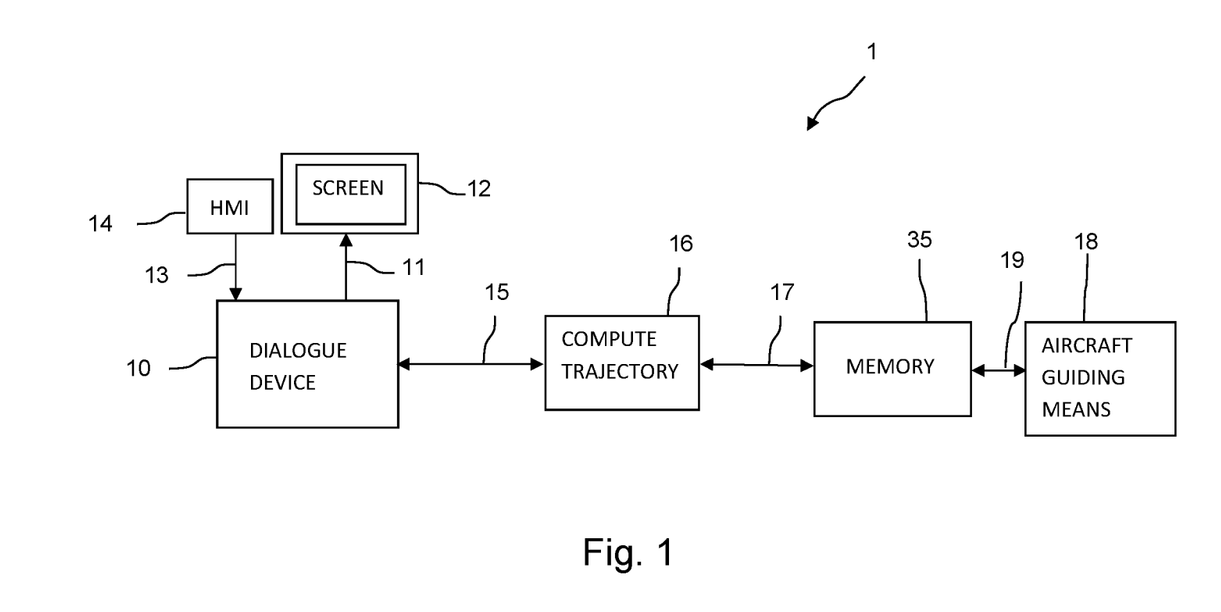
FIG. 1 represents, in a block diagram, an aircraft piloting assistance system conforming to one embodiment of the invention.

The piloting assistance system 1 represented in FIG. 1 comprises a device 10 for dialogue with an operator of the aircraft, in particular with a pilot. This dialogue device 10 is linked, by a link 11, to a screen 12 of the aircraft cockpit. It is also linked, by a link 13, to human-machine interface means 14, associated with the screen 12. The dialogue device 10 is also linked, by a link 15, to means 16 for computing a trajectory of the aircraft, which are linked, by a link 17, to a memory 35. The system also comprises aircraft guiding means 18, which are linked, by a link 19, to the memory 35.

As a nonlimiting example, the dialogue device 10 can correspond to an application loaded in a modular avionics computer of IMA (Integrated Modular Avionics) type. The means 16 for computing a trajectory may also correspond to an application loaded in a modular avionics computer. The application corresponding to the dialogue device 10 and the application corresponding to the means 16 for calculating a trajectory may also be loaded in the same modular avionics computer, or loaded in distinct modular avionics computers. Alternatively, the means 16 for computing a trajectory may correspond to a flight management computer of FMS type (Flight Management System) comprising a trajectory computation. The aircraft guiding means 18 may correspond to a computer for guiding the aircraft of FGS (Flight Guidance System) type or of FGCS (Flight Guidance and Control System) type.

During an approach in order to land the aircraft, other than an automatic landing, the aircraft is generally guided automatically, as far as a decision height, along a predetermined trajectory. When it arrives at this decision height, or substantially before the latter, if the pilot can see, from the aircraft, the planned landing area, he or she can decide to continue the landing. Otherwise, he or she must interrupt the landing by using a trajectory provided for this purpose. If he or she decides to continue the landing, the piloting assistance system according to the invention can provide the pilot with assistance during said landing.

In most cases, the landing area is a landing runway of an airport. However, the invention may also apply in the case of a landing area other than a landing runway, for example an area not specifically for landing aircraft which could be used for an emergency landing or for an improvised landing.

The screen 12 is preferably a head-up display HUD type device. Thus, the pilot can see the outside of the aircraft by transparency through this screen. The symbols displayed on this screen are thus displayed overlaid on the view outside the aircraft that the pilot can have through this HUD-type screen. The landing area must be visible to the pilot, at the decision height, to be able to continue the landing. Consequently, at least a part of said landing area forms part of the view outside the aircraft that the pilot can have through this HUD-type screen.

In a first step, the dialogue device 10 determines an initial value of a target corresponding to this landing and sends information concerning this target, via the link 11, to the screen 12 which displays the duly determined target. The pilot can thus see this target overlaid on the view outside the aircraft.

In a second step, the pilot can use the human-machine interface means 14 to modify the target on the screen 12. For that, the dialogue device 10 receives commands originating from the human-machine interface means 14 via the link 13 and determines a new value of the target conforming to the actions of the pilot on the human-machine interface means 14. The dialogue device 10 sends, via the link 11, this new value of the target to the screen 12 which displays the target thus modified by the pilot. The pilot can modify the target on the screen until the latter is compatible with the landing that he or she wants to make.

In a third step, the pilot can use the human-machine interface means 14 to validate the target modified in the second step.

Preferably, the target comprises a target point on the ground. This target point may in particular correspond to the intersection between the ground and the last segment of an axis of approach of the aircraft on the landing area. Even more preferably, the target also comprises an axis of a taxiing trajectory on the ground planned for the taxiing of the aircraft immediately after its contact with the ground. The direction of this taxiing axis is, for example, identified by its route TRK ("track"), which corresponds to the angle between this axis and north. The target may also comprise the FPA slope of the last segment of the axis of approach of the aircraft to the landing area. The target point on the ground corresponds to the intersection between said last segment of the axis of approach and a straight line passing through the axis of the taxiing trajectory on the ground. These three parameters of the target (target point on the ground, axis of a taxiing trajectory on the ground, slope of the last segment of the axis of approach) make it possible, when they are set, to control the final landing trajectory of the aircraft. In the case where the target comprises these three parameters, in the second step the pilot moves the target point on the ground by using the human-machine interface means 14, for example a mouse, a trackball, a joystick, a pointer, a touch interface or arrows on a keyboard, so as to bring this target point to the desired position on the screen. Again using said human-machine interface means, he or she may modify the orientation of the axis of the taxiing trajectory. He or she may also modify the value of the slope by inputting it using a keyboard forming part of said human-machine interface means.

Figure 2:
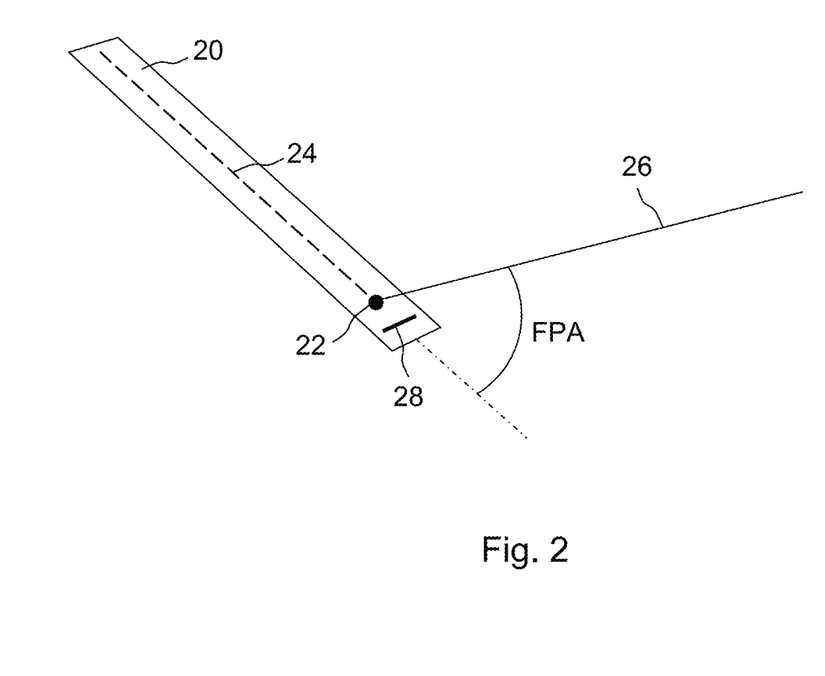
FIG. 2 schematically represents a target on the ground conforming to the invention, seen overlaid on a landing runway.

When the landing area is a landing runway, the initial value of the target determined in the first step may be positioned on a theoretical position of the landing runway. More particularly, as represented in FIG. 2, the target point on the ground 22 corresponding to the initial value of the target may be a point situated roughly in proximity to a runway threshold 28 of said landing runway 20 and the axis 24 of the taxiing trajectory on the ground may correspond to the longitudinal axis of said landing runway. The value of the FPA slope of the last segment 26 of the axis of approach may, for its part, correspond to a slope angle of value compatible with a landing on this landing runway. This value may, for example, be equal to 3 degrees.

Figure 3:
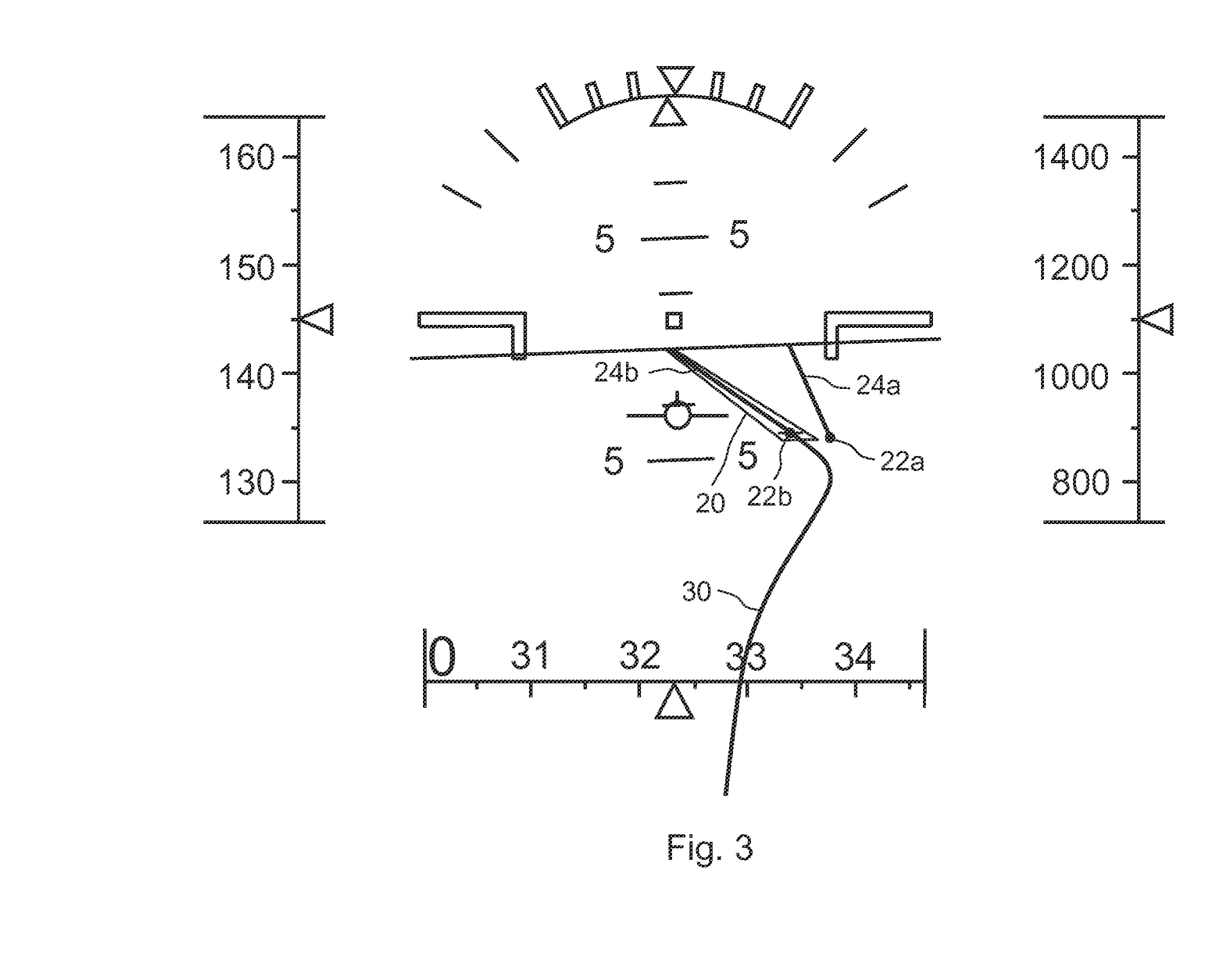
FIG. 3 represents a display on a screen of an aircraft which gives a better understanding of the invention.

Given the abovementioned aircraft position error, the theoretical position of the landing runway does not perfectly correspond to the real position of said landing runway on the view outside the aircraft that the pilot may have by transparency through the HUD-type screen 12. The result thereof is that the initial value of the target, as displayed on the screen, may be offset from the landing runway. For example, as represented in FIG. 3, the initial position of the target point on the ground 22a may be situated outside the landing runway 20 as seen by the pilot through the screen 12 and the initial value of the axis of the taxiing trajectory 24a may not be parallel to the longitudinal axis of the runway 20. In such a case, in the second step, the pilot moves the target point on the ground 22a using human-machine interface means 14, to bring it to the point 22b close to the runway threshold of the landing runway 20. Still using said human-machine interface means, he or she then modifies the orientation of the axis of the taxiing trajectory 24a to bring it to the position of the axis 24b parallel to the longitudinal axis of the landing runway 20.

In other cases, for example when the aircraft does not have information on the landing runway, when the landing area is not a landing runway, or even if the pilot chooses such an option, the initial value of the target may be a function of the current route of the aircraft. The target point on the ground may then correspond to the intersection with the ground of a current axis of approach of the aircraft. The axis of the taxiing trajectory may correspond to the continuation in projection on the ground, after the target point on the ground, of this axis of approach. The value of the FPA slope of the last segment of the axis of approach is either chosen to be equal to a predetermined value, preferably equal to 3 degrees, or chosen to be equal to the value of the current slope of the aircraft.

After the validation of the target by the pilot in the third step, the dialogue device 10 transmits, via the link 15, the duly validated target value to the means 16 for computing a trajectory of the aircraft. These computation means 16 then determine a trajectory 30 that can be followed by the aircraft and that enable the latter to perform a landing that conforms to the duly validated target, starting from its current position. Advantageously, the trajectory 30 determined by the means 16 may be displayed on the screen 12 as represented in FIG. 3.

The computation means 16 determine the trajectory 30 as a function of the relative position of the aircraft in relation to the target validated by the pilot and for which they have received the value via the link 15. Given that the target validated by the pilot is positioned on the screen overlaid on a view of at least a part of the landing area from the current position of the aircraft, the value of said target may be represented by the angular coordinates by which the pilot sees said target from the aircraft. These angular coordinates may be expressed notably by a heading angle and an azimuth angle. The value of the target transmitted by the dialogue device 10 to the computation means 16, via the link 15, may notably correspond to these two angles. In addition to these two angles, a third information item is necessary to define the relative position of the aircraft in relation to the target. This third information item may notably be:

the distance between the aircraft and the target; or
the relative height of the aircraft in relation to the target.

The distance between the aircraft and the target may be measured by means of a measurement system embedded on board the aircraft. This measurement system may use an orientable laser, for example of LIDAR (Light Detection And Ranging) type. To measure said distance, the light beam emitted by the laser is oriented towards the target, for example by using the abovementioned heading and azimuth angles.

The relative height of the aircraft in relation to the target may be determined by means of a radio altimeter when the ground is substantially horizontal between the current position of the aircraft and the position of the target. When the landing area is a landing runway of an airport, it is also possible to use a differential barometric pressure measurement if the airport is equipped with a barometric pressure measurement system from which pressure data are transmitted to the aircraft. The difference between the barometric pressure measured on board the aircraft and the barometric pressure measured at the airport makes it possible to compute the relative height of the aircraft in relation to the airport, therefore in relation to the target. When the aircraft has a terrain database, notably embedded on board the aircraft, and if the current altitude of the aircraft is known, on board the aircraft, sufficiently accurately, said relative height may be computed by the difference between said current altitude of the aircraft and the altitude of the target obtained from the database.

Alternatively, rather than use a third information item such as the distance between the aircraft and the target or the relative height of the aircraft in relation to the target to define the relative position of the aircraft in relation to the target, it is possible to use a double validation of the target by the pilot, at two given instants. In this case, the pilot validates a first value of the target at a first instant, in accordance with the third step. At a second instant, later than this first instant, the pilot corrects the target by reiterating the second step, then he or she validates a new value of the target at this second instant, in accordance with the third step. Since the distance traveled by the aircraft between these two instants is known, the relative position of the aircraft in relation to the target is determined by triangulation by using this distance traveled by the aircraft as well as the angular coordinates, for example the heading and azimuth angles, at each of the first and second instants.

Figure 4:
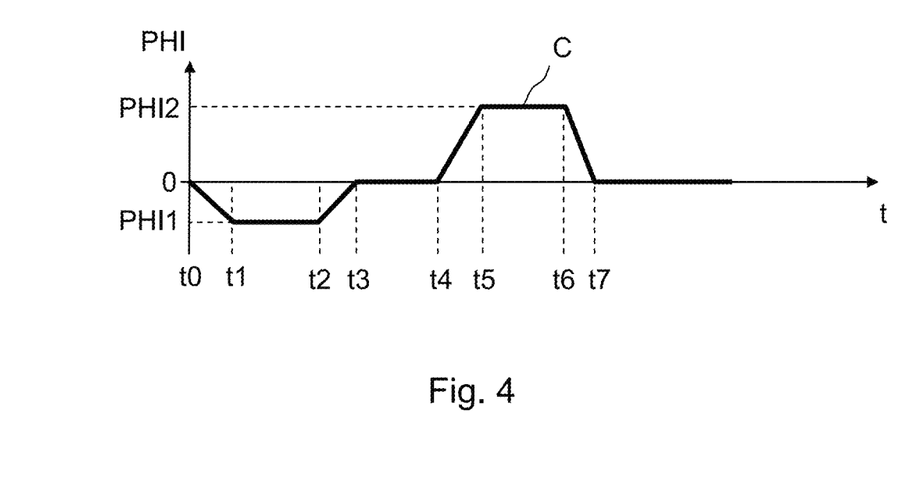
FIG. 4 illustrates a method for determining the trajectory of the aircraft until its landing.

To determine the trajectory 30 that makes it possible for the aircraft to meet the target from its current position, the computation means 16 may use any conventional trajectory computation method. As a nonlimiting example, they may use a method for optimizing a trajectory with two turns and at constant speed, as illustrated by FIG. 4. In this figure, the angle PHI represented on the vertical axis corresponds to the roll angle of the aircraft. The horizontal axis represents the time t. The curve C represents the trend of the angle PHI as a function of the time t. The aircraft is considered to be initialized with wings flat, that is to say PHI=0 at an initial instant t0. The computation means 16 determine a first trajectory that is continuous and can be diverted once, by considering an infinite speed of turn of the aircraft. Consequently, the instants t0, t2, t4, and t6 of start of lateral inclination of the aircraft and the respective instants t1, t3, t5, and t7 of end of lateral inclination of the aircraft satisfy the following relationships:

t0=t1; t2=t3; t4=t5 and t6=t7.

The computation means 16 then perform a geometrical computation to deduce therefrom the radii of the two turns, to which correspond respectively the roll angles PHI1 and PHI2, as well as the angular aperture of the circular arcs described (and therefore the instants t1, t3, t5 and t7) by minimizing the distance to meet the final axis while constraining the angles PHI1 and PHI2 not to exceed the performance limits of the aircraft. After having computed this first trajectory, the computation means 16 determine the flight trajectory 30 of the aircraft by computing the times needed to switch from one inclination of the aircraft to another (and therefore the times t1, t3, t5 and t7) so as not to exceed the maximum roll rate that the aircraft can fly. This method makes it possible to optimize the times and the inclinations to remain as close as possible to the first trajectory while observing the performance constraints of the aircraft.

The flight trajectory 30 is determined in real time, that is to say during the flight of the aircraft after the validation of the value of the target by the pilot in the step A3).

Once the trajectory 30 is determined, the means 16 transmit this trajectory, via the link 17, to the memory 35 which then stores this trajectory. The aircraft guiding means 18 then perform the guiding of the aircraft along said trajectory.

Advantageously, this trajectory is defined in a reference frame. According to a first embodiment, this reference frame is a terrestrial reference frame which may be a geographical reference frame or a reference frame referenced in relation to said target for which the value has been validated by the pilot. The position of the aircraft in relation to the target, and consequently in this reference frame, is known at the time of the validation of said target by the pilot. Since the movements of the aircraft are known on board the aircraft (by virtue of the inertial measurement, GPS and other systems), the position of the aircraft in this reference frame may be determined at any moment during the landing. This makes it possible, during the step C), to compute position errors between the current position of the aircraft (expressed in this reference frame) and its theoretical position on the stored trajectory, so as to guide the aircraft along said trajectory to its landing.

According to a second embodiment, this reference frame is a reference frame referenced in relation to the position of the aircraft at the time of the validation of the value of the target by the pilot in the step A3). Since the position of the aircraft in relation to the target is known at the time of the validation of said target by the pilot, the result thereof is that the position of the target in this reference frame is known. Since the movements of the aircraft are known on board the aircraft, the position of the aircraft in this reference frame can be determined at any moment during the landing. That makes it possible, during the step C), to compute position errors between the current position of the aircraft (expressed in this reference frame) and its theoretical position on the stored trajectory, so as to guide the aircraft along said trajectory to its landing.

Preferably, the value of the target validated by the pilot is stored in a memory of the system. Thus, after its validation by the pilot, the system continues to display this validated and stored target, overlaid on the view outside the aircraft. Since this target is stored, the system computes its display in such a way that the displayed position of said target does not change in relation to the landing area, regardless of the movements of the aircraft. Thus, after the validation of a value of the target in the step A3), provided that the said validated value is correct, the pilot does not need to modify the displayed target position, even until the aircraft lands. Advantageously, the value of the target thus stored is defined in said reference frame corresponding to the abovementioned first or second embodiment.

In a preferred embodiment of the invention, the guiding means 18 comprise an automatic pilot which makes it possible to automatically guide the aircraft along the trajectory determined by the means 16, to its landing. The pilot is thus relieved of the job of guiding the aircraft between its transition at the decision height and the landing, which enables him or her to devote attention to other tasks.

In another embodiment, the guiding means 18 comprise a flight director which makes it possible to assist the pilot during the landing. Thus, the pilot has only to follow the trajectory determined automatically by the means 16, by following the indications of the flight director. This also makes it possible to reduce his or her workload, although the latter is higher than in the case of the use of an automatic pilot.

The origin of the trajectory 30 corresponds to the current position of the aircraft at the moment of the validation of the target by the pilot in the third step. As explained above, the invention makes it possible to disregard the error on this position corresponding to the origin of the trajectory. During the guiding of the aircraft along the trajectory 30, the position of the aircraft can, for example, be calculated by double integration of acceleration information supplied by inertial units of the aircraft. This makes it possible to compute the position of the aircraft, in relation to the trajectory origin position, at any instant during the guiding along said trajectory, with a very reduced drift. The duration of the guiding along the trajectory 30 is sufficiently short (of the order of a minute) for the position error resulting from this drift to remain compatible with the accuracy necessary to the guiding of the aircraft.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for assisting in the piloting of an aircraft during a landing on a landing area on the ground, this aircraft comprising at least one display screen in its cockpit as well as human-machine interface associated with this screen, comprising the following steps:

A) during a phase corresponding to this landing, during which said landing area on the ground is visible from the aircraft:
A1) calculating an initial target and an initial axis of taxiing trajectory by a dialogue device and displaying, on said screen, the initial target corresponding to this landing, overlaid on a view outside the aircraft, said view comprising a view of at least a part of the landing area on the ground wherein:
the initial target is automatically displayed on the screen based on a point on the ground, the initial axis of taxiing trajectory on the ground, and a slope of an axis of approach; and
the initial axis of taxiing trajectory is automatically displayed on the screen from the target;
A2) receiving commands to modify the initial target and to modify the initial axis of taxiing trajectory by a pilot of the aircraft, using a human-machine interface associated with this screen and displaying the duly modified target and modified axis of taxiing trajectory on this screen in response to the modify commands;
A3) receiving a command to validate a value of the modified target by a pilot of the aircraft, using the human-machine interface associated with this screen wherein the value of the modified target includes positional coordinates of the target with respect to the aircraft such that the positional coordinates are based on a heading angle, an azimuth angle and at least one of:
a distance between the aircraft and the target; and
a relative height of the aircraft in relation to the target;
B) automatically determining a flight trajectory of the aircraft as a function of at least the relative position of the aircraft in relation to the value of the modified target validated by the pilot in the step A3) and storing this trajectory;
adjusting the flight trajectory of the aircraft based on a roll angle of the aircraft and a function of time while constraining the roll angle within predetermined performance limits of the aircraft; and
displaying the adjusted fight trajectory of the aircraft connecting to the modified target and the modified axis of taxiing trajectory on the screen; and
C) guiding the aircraft based on the displayed flight trajectory of the aircraft.

2. The piloting assistance method according to claim 1, in which the initial target and the modified target comprises at least one of:
a target point on the ground;
an axis of a taxiing trajectory on the ground; and
the slope (FPA) of the last segment of approach to the target point on the ground.

3. The piloting assistance method according to claim 1, wherein the screen is a head-up display (HUD) type device.

4. The piloting assistance method according to claim 1, in which the landing area on the ground corresponds to a landing runway.

5. The piloting assistance method according to claim 4, in which the value of the target displayed in the step A1) is determined as a function of characteristics of the landing runway.

6. The piloting assistance method according to claim 1, in which the value of the initial target displayed in the step A1) is determined as a function of the current route of the aircraft.

7. The piloting assistance method according to claim 1, in which the step A2) is performed iteratively.

8. The piloting assistance method according to claim 1, in which:

the value of the modified target validated by a pilot in the step A3) is stored; and during the step C), a target corresponding to said stored value is displayed overlaid on the view outside the aircraft.

9. The piloting assistance method according to claim 1, in which the steps A2), A3) and B) are repeated during the step C).

10. The piloting assistance method according to claim 1, in which the trajectory determined and stored in the step B) is defined in a terrestrial reference frame.

11. An aircraft piloting assistance system, said system comprising at least one display screen in the cockpit of the aircraft as well as human-machine interface associated with this screen, wherein that said piloting assistance system comprises:
- a device for dialogue with a pilot, this device being configured to:
- calculate an initial target and an initial axis of taxiing trajectory and display on this screen, during a landing of the aircraft on a landing area on the ground visible from the aircraft, the initial target corresponding to this landing, overlaid on a view outside the aircraft, said view comprising a view of at least a part of the landing area on the ground wherein:
  - the initial target is automatically displayed on the screen based on a point on the ground, the initial axis of taxiing trajectory on the ground, and a slope of an axis of approach; and
  - the initial axis of taxiing trajectory is automatically displayed on the screen from the target;
- receiving commands to modify the initial target and to modify the initial axis of taxiing trajectory by a pilot of the aircraft, using the human-machine interface, and displaying the duly modified target and modified axis of taxiing trajectory in response to the modify commands; and
- receiving a command to validate a value of the target by a pilot of the aircraft, using the human-machine interface wherein the value of the target includes positional coordinates of the modified target with respect to the aircraft such that the positional coordinates are based on a heading angle, an azimuth angle and at least one of:
- a distance between the aircraft and the target; and
- a relative height of the aircraft in relation to the target;
- a memory;
- a computation device configured to determine automatically a flight trajectory of the aircraft as a function of at least the relative position of the aircraft in relation to the value of the modified target validated by the pilot and to store this trajectory in said memory, and to adjust the flight trajectory of the aircraft based on a roll angle of the aircraft and a function of time while constraining the roll angle within the predetermined performance limited of the aircraft, and to display the adjusted flight trajectory of the aircraft connecting to the modified target and the modified axis of taxiing trajectory on the screen; and
- a guiding mechanism configured to guide the aircraft based on the displayed fight trajectory of the aircraft.

12. The piloting assistance system according to claim 11, in which the screen is a head-up display (HUD) type device.

13. The piloting assistance system according to claim 11, in which the guiding mechanism comprise a flight director configured to automatically control the display, in the cockpit, of indications enabling a pilot to guide the aircraft along the flight trajectory stored in said memory.

14. The piloting assistance system according to claim 11, in which the guiding mechanism comprise an automatic pilot configured to automatically guide the aircraft along the flight trajectory stored in said memory.

15. An aircraft comprising:
- a piloting assistance system having:
- at least one display screen in the cockpit of the aircraft as well as a human-machine interface associated with this screen, wherein said piloting assistance system comprises:
- a device for dialogue with a pilot, this device being configured to:
- calculate an initial target and an initial axis of taxiing trajectory and display on this screen, during a landing of the aircraft on a landing area on the ground visible from the aircraft, a target corresponding to this landing, overlaid on a view outside the aircraft, said view comprising a view of at least a part of the landing area on the ground wherein:
- the initial target is automatically displayed on the screen based on a point on the ground, the initial axis of taxiing trajectory on the ground, and a slope of an axis of approach; and
- the initial axis of taxiing trajectory is automatically displayed on the screen from the target;
- receiving commands to modify the initial target and to modify initial the axis of taxiing trajectory by a pilot of the aircraft, using the human-machine interface, and displaying the duly modified target and modified axis of taxiing trajectory on this screen in response to the modify commands; and
- receiving a command to validate a value of the target by a pilot of the aircraft, using the human-machine interface wherein the value of the target includes positional coordinates of the modified target with respect to the aircraft such that the positional coordinates are based on a heading angle, an azimuth angle and at least one of:
- a distance between the aircraft and the target; and
- a relative height of the aircraft in relation to the target;
- a memory;
- a computation device configured to determine automatically a flight trajectory of the aircraft as a function of at least the relative position of the aircraft in relation to the value of the modified target validated by the pilot and to store this trajectory in said memory, and to adjust the flight trajectory of the aircraft based on a roll angle of the aircraft and a function of time while constraining the roll angle within predetermined performance limits of the aircraft, and to display the adjusted flight trajectory of the aircraft connecting to the modified target of the modified axis of taxiing trajectory on the screen; and
- a guiding mechanism configured to guide the aircraft based on the displayed flight trajectory of the aircraft.

* * * * *